(12) United States Patent
Wang

(10) Patent No.: US 9,104,968 B2
(45) Date of Patent: *Aug. 11, 2015

(54) IDENTIFYING CATEGORIZED MISPLACEMENT

(71) Applicant: Alibaba Group Holding Limited, Grand Cayman (KY)

(72) Inventor: Yulin Wang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 14/302,332

(22) Filed: Jun. 11, 2014

(65) Prior Publication Data

US 2014/0297577 A1     Oct. 2, 2014

Related U.S. Application Data

(63) Continuation of application No. 13/513,547, filed as application No. PCT/US2012/021488 on Jan. 17, 2012, now Pat. No. 8,812,420.

(30) Foreign Application Priority Data

Jan. 25, 2011   (CN) .......................... 2011 1 0026733

(51) Int. Cl.
*G06F 17/00*     (2006.01)
*G06N 5/02*     (2006.01)
*G06N 5/04*     (2006.01)
*G06Q 30/00*    (2012.01)

(52) U.S. Cl.
CPC .. *G06N 5/04* (2013.01); *G06N 5/02* (2013.01); *G06Q 30/00* (2013.01)

(58) Field of Classification Search
None
See application file for complete search history.

(56) References Cited

U.S. PATENT DOCUMENTS

| | | | |
|---|---|---|---|
| 6,697,799 B1 | 2/2004 | Neal et al. |
| 6,823,323 B2 | 11/2004 | Forman et al. |
| 6,978,275 B2 | 12/2005 | Castellanos et al. |
| 7,376,635 B1 | 5/2008 | Porcari et al. |
| 7,493,315 B2 | 2/2009 | Holbrook |
| 7,584,016 B2 | 9/2009 | Weaver |

(Continued)

OTHER PUBLICATIONS

Extracting product features from online reviews for sentimental analysis, Hui Song ; Yingxiang Fan ; Xiaoqiang Liu ; Dao Tao Computer Sciences and Convergence Information Technology (ICCIT), 2011 6th International Conference on Publication Year: 2011 , pp. 745-750.*

(Continued)

*Primary Examiner* — Michael B Holmes
(74) *Attorney, Agent, or Firm* — Lee & Hayes, PLLC

(57) ABSTRACT

The present disclosure provides methods and devices for identifying category misplacement. In one embodiment, an example device obtains a word frequency of each respective word in a product title under a current category, calculates an overall word frequency of the product title under the current category based on the word frequency of each respective word under the current category, and compares the overall word frequency of the product title with a threshold of the current category to determine an existence of category misplacement. The techniques can accurately identify category misplacement and reduce the probability of missing identifying category misplacement. The techniques also require less system resources and improve calculation efficiency.

20 Claims, 10 Drawing Sheets

(56) References Cited

U.S. PATENT DOCUMENTS

| | | | |
|---|---|---|---|
| 7,870,039 | B1 | 1/2011 | Dom et al. |
| 7,890,382 | B2 | 2/2011 | Robb et al. |
| 7,996,719 | B2 | 8/2011 | Bernabeu-Auban et al. |
| 8,024,413 | B1 | 9/2011 | Kolcz |
| 8,150,742 | B2 | 4/2012 | Su |
| 8,489,916 | B2 | 7/2013 | Wang et al. |
| 8,812,420 | B2* | 8/2014 | Wang .............................. 706/46 |
| 2002/0062302 | A1 | 5/2002 | Oosta |
| 2002/0083079 | A1 | 6/2002 | Meier et al. |
| 2004/0083224 | A1 | 4/2004 | Yoshida |
| 2008/0183665 | A1 | 7/2008 | Brinker et al. |
| 2011/0238534 | A1 | 9/2011 | Yakkala |
| 2012/0036522 | A1 | 2/2012 | Wang |
| 2013/0304687 | A1* | 11/2013 | Wang .............................. 706/46 |
| 2014/0067815 | A1* | 3/2014 | Sun et al. ...................... 707/739 |
| 2014/0297577 | A1* | 10/2014 | Wang .............................. 706/46 |

OTHER PUBLICATIONS

Sentiment Mining within Social Media for Topic Identification, Ostrowski, D.A. Semantic Computing (ICSC), 2010 IEEE Fourth International Conference on DOI: 10.1109/ICSC.2010.29 Publication Year: 2010 , pp. 394-401.*

Semantic Keyword Selection for Automatic Video Annotation Imran, A.S. ; Rahadianti, L. ; Cheikh, F.A. ; Yayilgan, S.Y. Signal-Image Technology & Internet-Based Systems (SITIS), 2013 International Conference on DOI: 10.1109/SITIS.2013.49 Publication Year: 2013 , pp. 241-246.*

A Weibo-Oriented Method for Unknown Word Extraction Shuai Zhang ; Qianren Liu ; Lei Wang Semantics, Knowledge and Grids (SKG), 2012 Eighth International Conference on DOI: 10.1109/SKG.2012.15 Publication Year: 2012 , pp. 209-212.*

Kelly, et al., "Prototypicality in a Linguistic Context: Effects on Sentence Structure", Journal of Memory and Language 25, 1986, pp. 59-74, retrieved from the internet on May 12, 2012 at http://www.yale.edu/cogdevlab/aarticles/prototypiclality.pdf.

PCT Search Report mailed May 25, 2012 for PCT application No. PCT/US12/21488, 6 pages.

Chinese office action from counterpart application No. 201110026733.9, dated Apr. 9, 2013, 6 pages.

* cited by examiner

IDENTIFYING CATEGORIZED MISPLACEMENT

CROSS REFERENCE TO RELATED PATENT APPLICATIONS

This application is a continuation of and claims priority to U.S. patent application Ser. No. 13/513,547, filed Jun. 1, 2012, which is national stage application of an international patent application PCT/US12/21488, filed Jan. 17, 2012, which claims foreign priority to Chinese Patent Application No. 201110026733.9 filed on Jan. 25, 2011, entitled "METHOD AND DEVICE FOR IDENTIFYING CATEGORY MISPLACEMENT," which applications are hereby incorporated by reference in their entirety.

TECHNICAL FIELD

The present disclosure relates to a field of data processing technology and, more specifically, to a method and a device for identifying category misplacement.

BACKGROUND

With the development of e-commerce, online stores and online transactions are becoming more and more common among online users. An online trading system provides an online trading platform where the products in the online stores are managed based on categories. Each broad category may be divided into smaller sub-categories, thereby forming a category tree. As the number of online products increase, the category tree also grows bigger. Thus sellers operating the online stores may unintentionally or intentionally place the products they're selling under the incorrect categories, which is known as category misplacement.

The category misplacement may lead to inaccurate search results, and may also waste system storage and computing resources and give unpleasant user experiences. For example, a user clicks the category tree to view products of category A, but products of category B are presented. The category misplacement may also cause losses to the sellers. For example, products that are misplaced in a wrong category may be overlooked. If products that are misplaced in the wrong category can be identified and corrected, then the negative effects mentioned above can be eliminated, thereby increasing utilization of the system storage and the computing resources and providing better services to both the buyers and sellers.

One method for identifying misplaced products is based on a click dictionary. The click dictionary is composed of multiple records, where each record indicates a probability that the user clicks a specific category within a search result of a query made by the user. Based on recording of the user's query and click behaviors, a distribution of the products that the user has clicked for a specific query can be obtained. When it is determined whether a product has been misplaced in the wrong category, a title of the product is segmented. Each word resulting from the segmentation is treated as one query and a category distribution of the query is searched through the click dictionary. If a matched category is found, then no category misplacement exists; otherwise, category misplacement exists.

When using the above method for a massive amount of data (e.g. tens of millions or billions of product data), there is a high chance of omission for identifying the category misplacement. Such method may only identify and recall tens of thousands of category misplacement data. One reason is that there is a huge amount of data in the click dictionary and the distribution is sparse, and a majority of the products with category misplacements are not covered in the click dictionary queries. Another reason is that the method requires intensive computation and complex process which leads to high system resource requirement and long calculation time. Therefore, the above method cannot satisfy requirements of internet industries.

SUMMARY

The present disclosure provides methods and devices for identifying category misplacement to reduce the probabilities of missing category misplacement. The present disclosure may lower the system requirements for identifying category misplacement, conserve system resources, and increase calculation efficiency.

The present disclosure provides a method for identifying category misplacement. A word frequency of each word in a product title under a current category is obtained. Based on the word frequency of each word under the current category, the overall word frequency of the product title is obtained. The overall word frequency of the product title is then compared with a first threshold of the current category. Based on a result of the comparison, it is determined whether there is category misplacement.

The present disclosure also provides another method for identifying category misplacement. A TOP value of each word in a product title under a current category is obtained. The TOP value of the word is a sum of word frequencies of words under the current category whose word frequencies are higher than that of the word in the product title. Based on a predetermined mapping relationship between the TOP value and the relevancy degree value, the relevancy degree value that corresponds to each word's TOP value is obtained. The relevancy degree values that correspond to the words' TOP values are added up to obtain the overall relevancy degree value of the product title under the current category. The overall relevancy degree value of the product title under the current category is compared with a second threshold. Based on a result of the comparison, it is determined whether there is category misplacement.

The present disclosure provides a device for identifying category misplacement. The device includes a word frequency obtaining module, an overall word frequency calculation module, and a category misplacement determination module. The word frequency module obtains a word frequency of each word in a product title under a current category. The overall word frequency calculation module, based on the word frequency of each word under the current category, calculates the overall word frequency of the product title. The category misplacement determination module compares the overall word frequency of the product title with a first threshold of the current category, and determines, based on a result of the comparison, whether there is category misplacement.

The present disclosure provides another device for identifying category misplacement. The device includes a TOP value obtaining module, an overall relevancy degree value obtaining module, and a category misplacement determination module. The TOP value obtaining module obtains a TOP value of each word in a product title under a current category. The TOP value of the word is a sum of word frequencies of words under the current category whose word frequencies are higher than that of the word in the product title. The overall relevancy degree value obtaining module, based on a predetermined mapping relationship between the TOP value and the relevancy degree value, obtains the relevancy degree value that corresponds to each word's TOP value, and adds up the relevancy degree values that correspond to the words' TOP values to obtain the overall relevancy degree value of the product title under the current category. The category misplacement determination module compares the overall relevancy degree value of the product title under the current category with a second threshold, and determines, based on a result of the comparison, whether there is category misplacement.

The methods and devices in the present disclosure are capable to determine whether there is category misplacement based on the result of the comparison between the overall word frequency of the product title and the first threshold. In addition, the TOP value can reflect a degree of matching between the product title and the category. Thus the overall relevancy degree value between the product title and the category determined by the TOP value can also reflect a matching degree between the product tile and the category. The result of comparison between the overall relevancy degree value of the product title under the category and the second threshold can also be used to determine whether there exists category misplacement. The setting of the second threshold can reduce the probability of missing category misplacements. For example, if the second threshold is set at a lower value, a majority of category misplacements may be identified. In addition, the techniques disclosed in the present disclosure relate to obtaining the TOP value and the overall relevancy degree value. Compared with the current techniques, the techniques disclosed in the present disclosure require less system resources and improve calculation efficiency.

BRIEF DESCRIPTION OF THE DRAWINGS

To better illustrate embodiments of the present disclosure or techniques of the current technologies, the following is a brief introduction of figures to be used in descriptions of the embodiments. It is apparent that the following figures only relate to some embodiments of the present disclosure. A person of ordinary skill in the art can obtain other embodiments according to the figures in the present disclosure without creative efforts.

DETAILED DESCRIPTION

The following provides a detailed description of the example embodiments in the present disclosure. The example embodiments described here are only used as examples for discussions, and are not used to limit the present disclosure.

Products are placed based on categories. Each product has a title, which is used to describe the product. Category and title are the two basic attributes of a product.

The title is generally a short phrase, which can be divided into a set of words by segmentation. The relationship between the title and the words may be expressed by using the formula (1) below:

$$T = t_1 t_2 \ldots t_n \quad (1)$$

In the above formula (1), T represents the title, where the title T is composed of a plurality of words t (including $t_1$, $t_2, \ldots, t_n$, where n is a positive integer).

In addition, a number of products under a category is calculated. In one embodiment, based on one or more pre-defined rules, a product is placed under one category. Thus the total number of products under all categories is equal to the total number of all products. The number of products under a category can represent the frequency of the appearance of the category.

In order to identify category misplacement, whether the product title matches the current category of the product title may be checked first. In other words, for different product titles under a given category, the matching degree between each of the product titles and the current category may be firstly measured.

Figure 1:
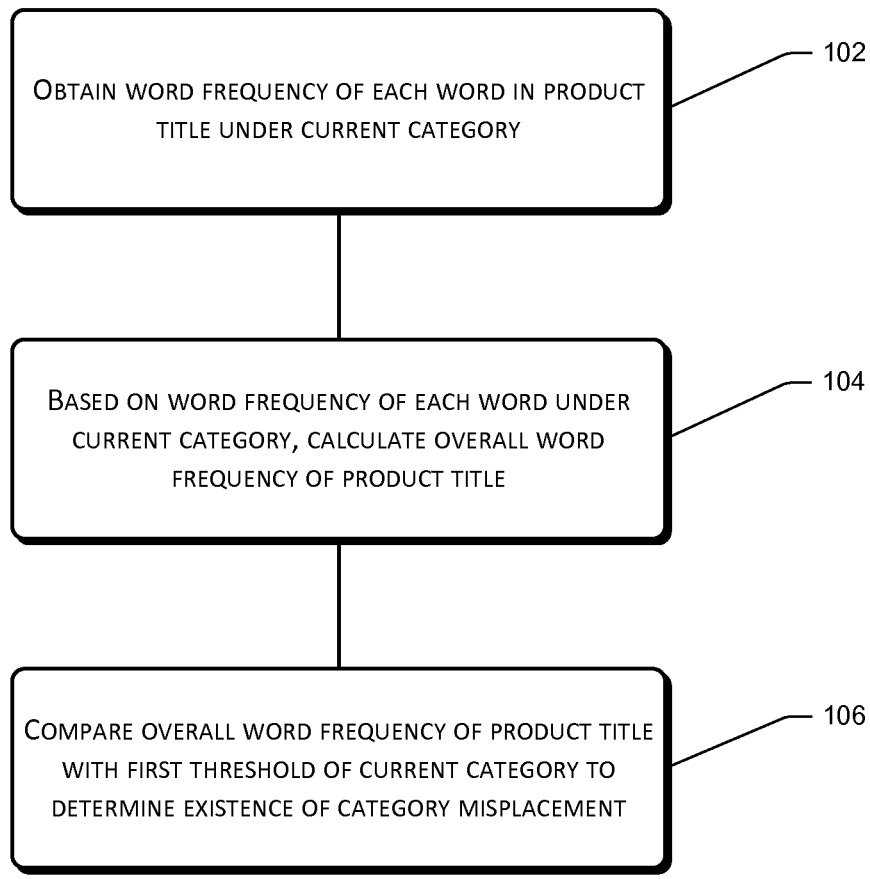
FIG. 1 illustrates a flowchart of an example method for identifying category misplacement in accordance with a first example embodiment of the present disclosure.

FIG. 1 illustrates a flowchart of an example method for identifying category misplacement in accordance with a first example embodiment of the present disclosure. The first example embodiment may include the following operations.

At 102, a word frequency of each word in a product title under a current category is obtained.

A database including one or more categories is provided. Each category in the database includes at least a word and a word frequency of the word under the category. The word frequency is a probability value of the word under each category. Generally, the word frequency of the word under different categories is different. The concept of word frequency is described in details below by reference to some specific examples.

The product title is composed of one or more words, and the frequencies of appearance of each word under different categories are not the same. For example, the word "Nike" appears frequently in product titles under the sports product categories such as the "sports shoes" category and the "sports attire" category, while the word "Nokia" appears frequently in product titles under the "mobile phone" category. In contrast, "Nike" rarely appears in the product titles under the "mobile phone" category, and "Nokia" rarely appears in the product titles under the "sports shoes" category. It shows that the word frequency of a specific word is different under different categories. Such differences may be used to differentiate the categories.

Based on the example embodiment of the present disclosure, the word frequencies of all words under multiple or all categories may be calculated. For example, for a given word t and a given category C, a word frequency $TF_{t,C}$ can be obtained. The $TF_{t,C}$ represent the probability of appearance of the word t under the category C, i.e., P(t|C). Based on the number of words of all product titles under a certain category, the word frequency $TF_{t,C}$ can be represented as a numeric value between (0,1). Different combinations of t and C can lead to multiple word frequencies.

In actual applications, the word frequencies of various words under different categories may be obtained and used to build a database. Such various words may include all words of the product titles that appear in the market. The database can be stored in a computer-readable media including memory such as read-only memory (ROM) and random access memory (RAM).

At 104, based on the word frequency of each word under the current category, the overall word frequency of the product title is obtained.

The overall word frequency of the product title may be accumulated based on the obtained word frequency of each word under the current category. Alternatively, a weight value may be defined for each word based on information such as the order of each word in the product title, whether the word is a duplicate, etc. Based on the weight value and word frequency of each word, the overall word frequency of the product title may be obtained by using a weighted calculation.

At 106, the overall word frequency of the product title is compared with a first threshold of the current category. Based on a result of the comparison, it is determined whether there is category misplacement.

The first threshold may be defined based on the words and their word frequencies under each category in the database. The lower the overall word frequency under the current category, the lower the possibility that the product title is classified under the current category. When the overall word frequency is lower than the defined first threshold, it may be deemed that there is category misplacement.

The first threshold may differ in different categories. In other words, based on the distribution characteristics of the word frequencies of the words in the product titles under different categories, different first thresholds may be predefined for different categories and a database may store such first thresholds. The database storing the first thresholds may be merged with the database storing the categories as a single database. Alternatively, these two databases may be independent and each is stored at corresponding computer storage device respectively.

For example, the first threshold of the "sports shoes" category may be defined as 0.6, and the first threshold for the "mobile phone" category may be defined as 3. Assuming that the overall word frequency of "Nike jogging shoes" under the "sports shoes" category is 1.5, and the overall word frequency of "Nike jogging shoes" under the "mobile phone" category is 0.2, as the overall word frequency of "Nike jogging shoes" under the "sports shoes" category is higher than the "sports shoes" category's first threshold which is 0.6, the possibility that the product title is classified under the "sports shoes" category is high. As the overall word frequency of "Nike jogging shoes" under the "mobile phone" category is 0.2 which is far less than the "mobile phone" category's first threshold which is 0.6, the possibility that the product title is classified under the "mobile phone" category is low.

In addition, when calculating the word frequencies, some words may appear many times in multiple categories, such as "special offer", "discount", "hot selling," descriptive symbol such as "【】" and auxiliary words such as "of", "also" and etc. Such words are called stop words. Since the frequencies of appearances of these stop words in the product titles under multiple categories do not fluctuate much, these word frequencies do not help much in classifying products under the categories. If the word frequencies are calculated for these stop words, it would not only waste computing resources, but also have counter effects sometimes. For example, if a certain stop word x appears many times in product titles under category A, and rarely appears in the product titles under category B, then it is possible that a product title with the stop word x may be placed under category A.

To reduce the impact of the stop words in identifying category misplacement, a table of stop words may be preset to eliminate the stop words in the product titles, thereby reducing the calculation volume, and lowering the rate of misjudgment.

Below is an example method to determine the stop words.

Based on the definition of stop words, the more a word's word frequency is evenly distributed under multiple categories, the more likely such word is a stop word. Thus distribution entropy of each word in multiple or all categories may be used to determine if the word is a stop word. There are many techniques to determine the stop words. Below is an example method and shall not be construed as a limitation to determine the stop words in the present disclosure.

The formula (2) below may be used to calculate the distribution entropy of a word under multiple categories:

$$Ent(t) = \sum_{i=1,2,\ldots,n} P(t|C_i) \cdot \log \frac{1}{P(t|C_i)} \qquad (2)$$

In the formula (2), Ent(t) represents the distribution entropy of word t under all categories. The function $P(t|C_1)$ represents the word frequency of the word t under the category $C_1$, and n represents any integer.

After calculation of the distribution entropies of all words, the words are sorted based on the respective distribution entropy from the biggest to the smallest. A threshold is determined based on the sort order of each word. If the distribution entropy of a specific word is higher than the threshold, then such word is a stop word, and is added into the stop words table. Based on an example embodiment of the present disclosure, the threshold may be determined based on the actual data processing requirements.

In the first example embodiment as well as the succeeding example embodiments for identifying category misplacement, the stop words may be filtered to reduce the computation volume and the rate of misjudgment, and increase the speed of data processing.

Figure 2:
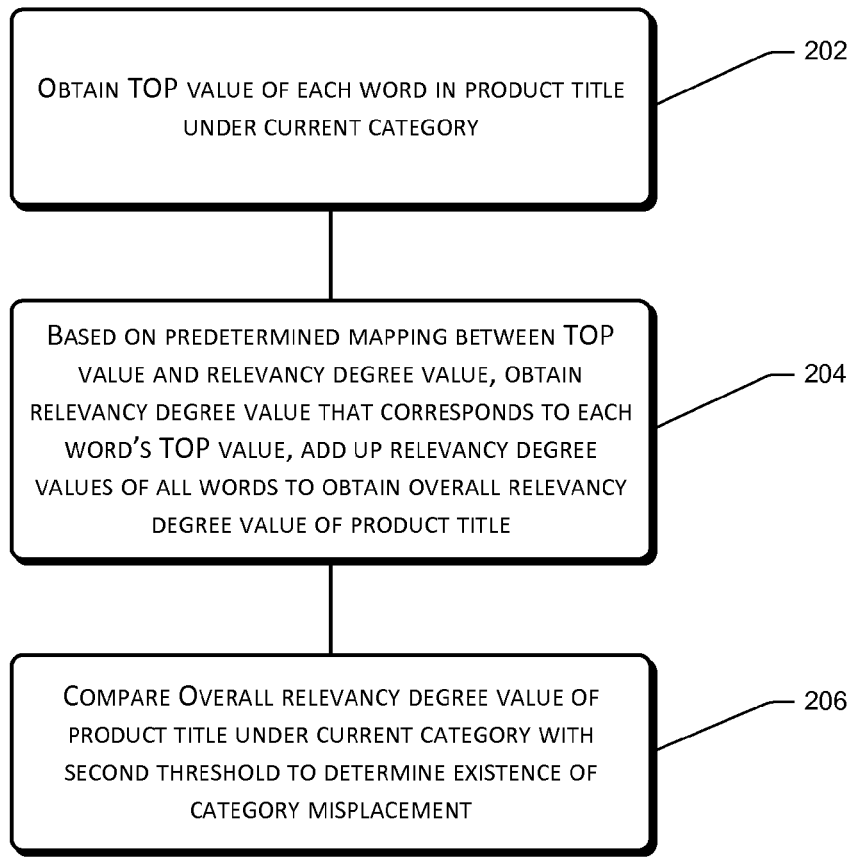
FIG. 2 illustrates a flowchart of an example method for identifying category misplacement in accordance with a second example embodiment of the present disclosure.

FIG. 2 illustrates a flowchart of a method for identifying category misplacement in the second example embodiment of the present disclosure. At 202, for each word in the product title, its respective TOP value under the current category is obtained. In this example embodiment, a database containing multiple categories is provided. Each category in the database included at least one word and its TOP value in the category.

This example embodiment uses the TOP value. The TOP value of a word in a certain category is the sum of the word frequencies of all words whose word frequencies are higher than the word. For example, there are three words in category C with word frequencies from the highest to the lowest, i.e., $t_1$, $t_2$, and $t_3$. The corresponding word frequency of each of these three words is $p_1$, $p_2$, and $p_3$ respectively. The corresponding TOP values of $t_1$, $t_2$, $t_3$ is 0, $p_1$, $p_1+p_2$, respectively. The TOP value reflects a degree of match between the word in a product title and a category. Through the TOP value, the complexity of identifying category misplacement may be simplified. In the above example, the word frequency $p_1$ of $t_1$ is the highest, and its TOP value is 0; while the word frequency $p_3$ of $t_3$ is the lowest, and its TOP value is $p_1+p_2$. In other words, the lower the TOP value of a word in a product title under a certain category, the higher the degree of match of the word of the product title in the category. In contrast, the higher the TOP value of a word in a product title under a certain category, the lower the degree of match of the word of the product title in the category.

When the TOP value of each word in each product title under each category is calculated, the stop words may be filtered firstly. In other words, the TOP values of the stop words are not calculated so that the TOP value can more accurately reflect the degree of match between a word in a product title and a category.

At 204, based on a predetermined mapping between the TOP value and the relevancy degree value, the relevancy degree value that corresponds to each word's TOP value is obtained. The relevancy degree values corresponding to the TOP values of all words in the product title are added up to obtain an overall relevancy degree value of the product title.

Table 1 shows an example mapping between the TOP values and their relevancy degree values.

TABLE 1

| TOP Value | Relevancy Degree Value |
| --- | --- |
| 0~0.1 | 100 |
| 0~0.2 | 50 |
| 0.2~0.3 | 30 |
| 0.3~0.4 | 10 |
| 0.4~0.5 | 5 |
| 0.5~0.6 | 1 |
| 0.6~0.7 | 0.5 |
| 0.7~0.8 | 0.2 |
| 0.8~1.0 | 0 |

The relevancy degree values in Table 1 show the relevancy degree between a category and a certain TOP value of a word. After the TOP value of each word is obtained, the relevancy degree value of each word can be retrieved from Table 1.

Since the probability value of the TOP value is a small number with multiple digits, if the TOP values are directly added up, the calculation volumes are huge and the differences in the calculation result are small, which cannot properly reflect the differences in the relevancy degrees of the product title at its corresponding category. Therefore, in this example embodiment of the present disclosure, through the relationship table of the TOP value and the relevancy degree value, the relevancy degree value that corresponds to the TOP value is quantified based on the distribution of the TOP value to simplify the TOP value computation. This will not only reduce the calculation complexity, but also more accurately reflect the degree of correlation of the product title at its corresponding category.

The mapping relationship between the TOP values and the relevancy degree values in Table 1 may be set based on the actual requirements of data processing. Table 1 only shows a sample list, and the mapping between the TOP values and the relevancy degree values is not limited to the contents of Table 1.

After the relevancy degree values that correspond to the TOP values of all words in the product title, the relevancy degree values are added up to obtain an overall relevancy degree value between the product title and the current category. For example, this may be shown using the formula (3) below:

$$RR(T, C) = RR(t_1 t_2 t_3 \ldots t_n, C) \quad (3)$$
$$= \sum_{i=1,2,\ldots,n} RR(t_i, C)$$
$$= \sum_{i=1,2,\ldots,n} F_{TR}(TOP(t_i, C))$$

In the above formula (3), RR(T,C) represents the overall relevancy degree value between the product title T and category C, $TOP(t_i, C)$ represents the TOP value of the word $t_i$ in the product title T under the product category C, $F_{TR}$ represents the mapping function that maps each word's TOP value to the relevancy degree value, and n represents any integer.

For example, for a product title T that contains three words $t_1$, $t_2$ and $t_3$, the TOP values of these three words under category C are TOP $(t_1,C)$, TOP $(t_2,C)$ and TOP $(t_3,C)$ respectively. Based on Table 1, the corresponding relevancy degree value of each of the three TOP values can be found. For example, the relevancy degree values found for the three TOP values are 10, 5 and 1 respectively. These three relevancy degree values are added up to obtain the overall relevancy degree value of the product title T and category C, which is 10+5+1=16.

At 206, the product title's overall relevancy degree value under the current category is compared with a second threshold, and based on the results of the comparison, it is determined if the product title has been placed in the wrong category or not.

For example, if the overall relevancy degree value of the product title under the current category is less than the second threshold, then it means that the relevancy degree between the product title and the current category is low, and it may be deemed that there exists the category misplacement. If the overall relevancy degree value of the product title under the current category is greater than or equal to the second threshold, then this means that the overall relevancy degree value of the product title under the current category may meet the requirement, and it may be deemed that there is no category misplacement.

The second threshold may be set based on the distribution state of the overall relevancy degree values of the product titles. The lower the overall relevancy degree value of the product title of the product to be classified, the lower the possibility of classifying the product under the current category. If the overall relevancy degree value of the product title is lower than the defined second threshold, it may be deemed that category misplacement exists. For example, if the second threshold is set as 20, and the overall relevancy degree value between the product title T and category C is 16, which is smaller than the second threshold of 20, it may be deemed that the product title T is incorrectly placed under category C.

The second threshold may differ in different categories. In other words, for a same product title, based on data obtained in practice, different second thresholds may be pre-defined for different categories and a database may store such second thresholds. The database storing the second thresholds may be merged with the database storing the categories as a single database. Alternatively, these two databases may be independent and each is stored at corresponding computer storage device respectively.

In addition, different second thresholds may be set for a same category based on actual requirements. If the second threshold is defined at a higher level, then the probabilities for identifying category misplacement may be higher, which would lead to a higher recall rate. In other words, the products that are determined as being placed in the wrong category can be recalled to be placed in the right category. In this way, the user is prompted to select a new category or modify the words in the product title, thereby increasing the accuracy of the search result.

In order to reduce the calculation volume, at 202, the TOP value of each word excluding the stop words in the product title under the current category may be obtained. At 202, the operations obtaining respective TOP value of each word in the product title may include determining whether there are stop words in the product title. Then in response to determining that there are stop words, such filter words from the product title are filtered. The TOP value of each word under the current category after the stop words have been filtered out is then obtained.

In the techniques provided by the second example embodiment of the present disclosure, since the TOP value reflects the degree of match between the product title and the category, and the overall relevancy degree value is determined based on the TOP value, the overall relevancy degree value between the product title and the category based on the TOP value is able to reflect the degree of match between the product title and the category. Based on a comparison result between the overall relevancy degree value of the product title under the current category and the second threshold, it may be determined if there is category misplacement. Based on the setting of the second threshold, the probability of missing out category misplacement may be reduced. In addition, the techniques of the second example embodiment relate to obtaining the TOP value and the overall relevancy degree value, which requires less system resources compared with current techniques, and conserves system resources and increases computation efficiency.

The following describes a third example embodiment. In the method in the second example embodiment, if the overall relevancy degree value of the product title under the current category is lower than the second threshold, it may be deemed that that there is category misplacement. However, in some cases, even if the overall relevancy degree value of the product title under the current category is lower than the second threshold, there is no category misplacement. For example, if the second threshold is set too high, some product titles whose overall relevancy degree values lower than the second threshold may be deemed as being placed in the wrong category, but in reality, these product titles are not misplaced.

To further increase the degree of accuracy of identifying the category misplacement, in the third example embodiment of the present disclosure, when the overall relevancy degree value between the product title and the current category is smaller than the second threshold and it is deemed that there is category misplacement, the method further includes predicting category.

Figure 3:
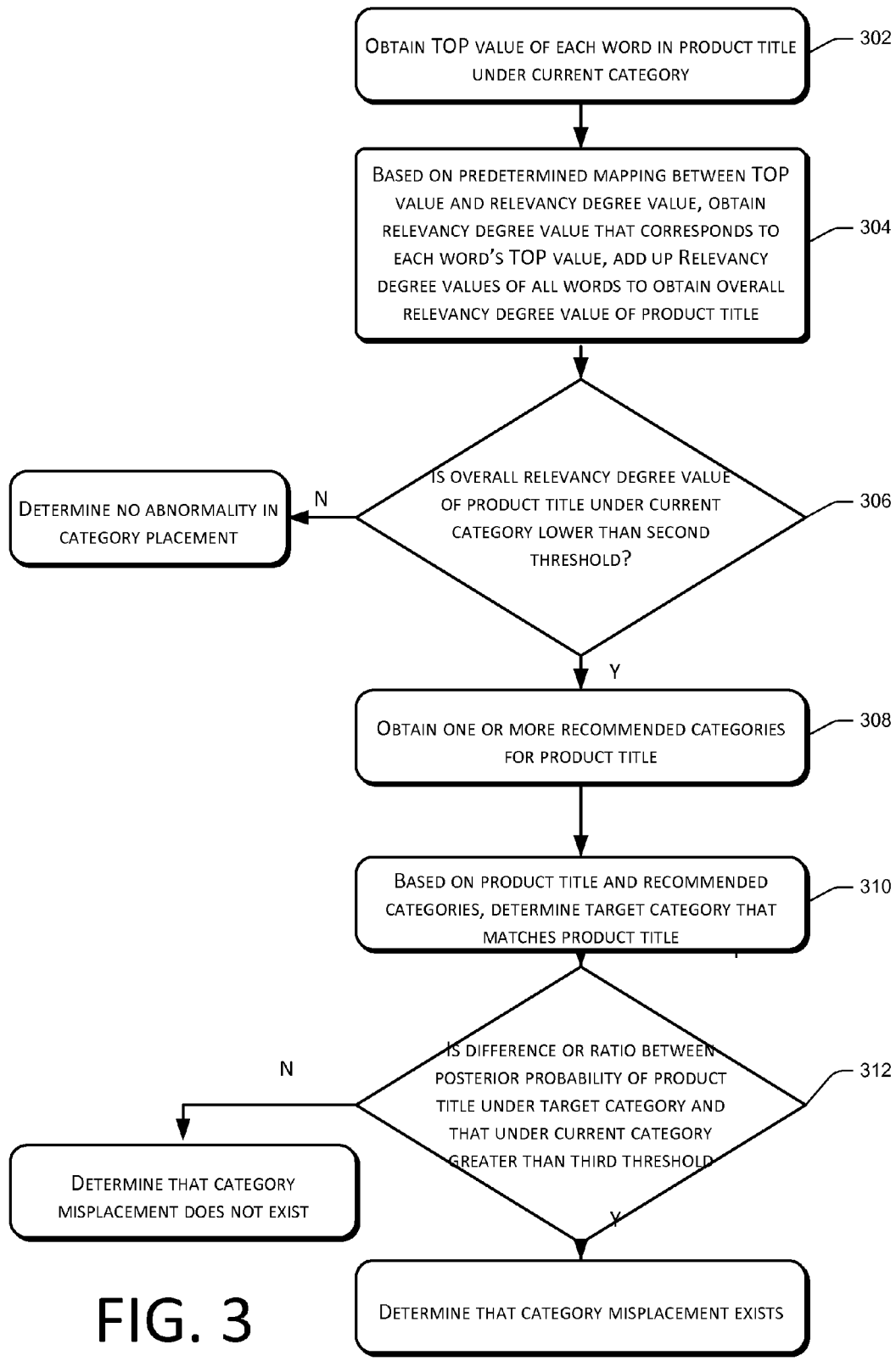
FIG. 3 illustrates a flowchart of an example method for identifying category misplacement in accordance with a third example embodiment of the present disclosure.

FIG. 3 shows a flowchart of an example method for identifying category misplacement in the third example embodiment of the present disclosure.

At 302, for each word in the product title, its respective TOP value under the current category is obtained.

At 304, based on a predetermined mapping between the TOP value and the relevancy degree value, the relevancy degree value that corresponds to each word's TOP value is obtained. The relevancy degree values corresponding to the TOP values of all words in the product title are added up to obtain an overall relevancy degree value of the product title.

At 306, the product title's overall relevancy degree value under the current category is compared with a second threshold. If the product title's overall relevancy degree value under the current category is less than the second threshold, it is determined that there is abnormal category misplacement and operations at 308 are performed. If the product title's overall relevancy degree value under the current category is less than the second threshold, it is determined that there is no abnormal category placement.

At 308, one or more recommended categories for the product title are obtained.

At 310, based on the product title and the product title's recommended category, a target category that matches the said product title is obtained.

At 312, a posterior probability of the product title under the target category and a posterior probability of the product title under the current category are obtained. The posterior probability of the product title under the target category is compared with the posterior probability of the product title under the current category. If the difference or ratio between the posterior probability of the product title under the target category and the posterior probability of the product title under the current category is greater than a third threshold, then it is determined that category misplacement exists; otherwise, it is determined that no category misplacement exists.

At 306, when it is determined that there is abnormality in the product placement, it means that the current category may not be the most appropriate category. Therefore, other categories may be retrieved, and operations to determine if the product title better matches these other categories are conducted.

At 308, during the process to obtain the recommended category that matches the product title, the degree of match between the product title and all categories may be compared to obtain the recommended category that matches the product title. There are various techniques to compare the degrees of match between the product title and the categories. For example, the categories may be searched based on the words in the product title, and the comparison result between the words in the product title and the categories may be used to obtain the recommended category. The details are not described herein. However, the method for comparing the degrees of match between the product title and all categories has relatively low efficiency as the computation volume is huge.

For another example, a recommended category database is provided. The recommended category database stores various words in the product titles and the recommended category that corresponds to each word. The database for recommended category may be an independent database, or may be combined with the database containing different categories as described in the second example embodiment to form a single database. Each category in the database contain at least one word, the TOP value of each word in the category, and the corresponding recommended category of each word. The recommended category of each word may be determined based on the appearance probability of the word in different categories. For instance, at least one category with high appearance probability of the word may be used as the recommended category. At 308, the recommended category of each word in the product title may be obtained through the recommended category database.

At 310, for example, based on the obtained recommended category that corresponds to each word in the product title, the corresponding word frequency of each word in a respective recommended category is used as a weight of the respective recommended category. After calculation of the sum of weight of each recommended category, the recommended category with the highest combined weight may be used as the target category.

For example, Table 2 shows a list of example recommended categories in this example embodiment of the present disclosure. For example, the product title is "Kongming Lantern" which includes one word "Kongming Lantern." The two recommended categories for this product title is "Household Use/Receptions/Gifts >> Wedding Supplies Service Area >> Kongming Lantern/Wishing lamp" (Category Number: 50014247) and "Toys/Models/Dolls/Figures >> Chinese Traditional Toys >> Kongming Lantern" (Category Number: 50016031). The word frequency of "Kongming Lantern" in the category "Household Use/Receptions/Gifts >> Wedding Supplies Service Area >> Kongming Lantern/Wishing lamp" is 0.144263, hence the weight of this recommended category is 0.144263. The word frequency of "Kongming Lantern" in the category Toys/Models/Dolls/Figures >> Chinese Traditional Toys >> Kongming Lantern" is 0.139776, hence the weight of this recommended category is 0.139776. As the product title contains only one word, the sums of weight of the two recommended categories "Household Use/Receptions/Gifts >> Wedding Supplies Service Area >> Kongming Lantern/Wishing lamp" and "Toys/Models/Dolls/Figures >> Chinese Traditional Toys >> Kongming Lantern" are 0.144263 and 0.139776 respectively. The recommend category "Household Use/Receptions/Gifts >> Wedding Supplies Service Area >> Kongming Lantern/Wishing lamp" may be selected as the target category of choice. Alternatively, both of the two recommended categories may be used as alternative target categories.

TABLE 2

| | Category | |
|---|---|---|
| | Household Use/Receptions/Gifts >> Wedding Supplies Service Area >> Kongming Lantern/Wishing lamp | Toys/Models/Dolls/Figures >> Chinese Traditional Toys >> Kongming Lantern |
| Category Number | 50014247 | 50016031 |
| Word frequency of "Kongming Lantern" | 0.144263 | 0.139776 |

"Kongming Lantern" is an example that the product title contains a single word. Below is an example of a product title containing multiple words.

For example, a product has a product title "Blue Cotton Shirt." After segmentation of the product title, three words are obtained, i.e. "Blue," "Cotton," and "Shirt." From the recommended category database, the corresponding recommended categories of each of the three words may be retrieved. Each word may correspond to one or more different recommended categories and the weight may differ in the different recommended categories. Based on the sort order of the weights from the biggest to the smallest, the categories with top big weights may be selected. For example, for each word, the top three categories with biggest weights may be selected. Under the scenario where these are no duplicates in the categories, the three words correspond to a total of nine categories. In these nine categories, by comparison of the sum of the weights of the three words in the different categories, one or more categories with top biggest weights may be selected as the recommended categories.

For example, with regard to the product title "Blue Cotton Shirt," based on the above process, the top three recommended categories obtained from the recommended category database are "Children's Wear/Children's Shoes/Pregnant Women's Wear >> Shirt," "Men's Wear >> Shirt," and "Ladies' Wear >> Ladies' Boutique >> Shirt." Table 3 shows an example of the recommended categories for "Blue Cotton Shirt."

TABLE 3

| | Category | | |
|---|---|---|---|
| | Children's Wear/Children's Shoes/Pregnant Women's Wear >> Shirt | Men's Wear >> Shirt | Ladies' Wear >> Ladies' Boutique >> Shirt |
| Category Number | 50010527 | 50011123 | 162104 |
| Word frequency for "Blue" | 0.00351304 | 0.00271352 | 0.00186753 |
| Word frequency for "Cotton" | 0.0149095 | 0.0148579 | 0.00693222 |
| Word frequency for "Shirt" | 0.0974684 | 0.129388 | 0.0905442 |
| Sum of Weights | 0.11589094 | 0.14695942 | 0.09934395 |

In Table 3, the word frequencies of "Blue" in the three recommended categories are: 0.00351304, 0.00271352, and 0.00186753 respectively. In other words, the weights of the three recommended categories for "Blue" are 0.00351304, 0.00271352, and 0.00186753 respectively. Similarly, the weights of the three recommended categories for "Cotton" are 0.0149095, 0.0148579, and 0.00693222 respectively, and the weights of the three recommended categories for "Shirt" are 0.097684, 0.129388, and 0.0905442 respectively.

The sum of the weights for the recommended category "Children's Wear/Children's Shoes/Pregnant Women's Wear >> Shirt" is 0.00351304+0.0149095+0.0974684=0.11589094; the sum of the weights for the recommended category "Men's Wear >> Shirt" is 0.00271352+0.0148579+0.129388=0.14695942; and the sum of the weights for the recommended category "Ladies' Wear >> Ladies' Boutique >> Shirt" is 0.00186753+0.00693222+0.0905442=0.09934395. Among the three, the one with the highest sum of weights is the category "Men's Wear >> Shirt", thus the category "Men's Wear >> Shirt," which can be selected as the target category of choice. Alternatively, these three categories may all be used as alternative target categories.

Based on the example above, at 310 the target category may be obtained by calculating sum of the weights of each recommended category. In another example, the probabilities of appearance of each word in the product title may be formed as a product title vector. The word frequency of each word in a certain category may be formed as a category vector. Through calculation of the product of the product title vector and the category vector, the target category may be determined.

For example, at 310, the product title vector and the category vector of the predicted categories may be obtained. The elements in the product title vector are the probabilities of appearance of each word in the product title. The elements in the category vector are the word frequencies of each word of the product title under the predicted category. For each predicted category, the product of the product title vector and category vector is obtained. The predicted category with the highest product may be selected as the target category. In this example embodiment of the present disclosure, the predicted categories refer to the candidate categories for selection.

Below is an example showing how to obtain the target categories.

For example, the product title "Mickey MP3 Fourth Generation Blinking Mickey (2G) Multiple Colors Choice" may be segmented into eight words, i.e., "Mickey," "MP3," "Fourth Generation," "Blinking," "Mickey," "2G," "Multiple Colors," and "Choice." The appearance probability of "Mickey" in the product title is 0.25, and the appearance probability of each of the remaining words is 0.125. Thus the product title vector of the product title may be represented as:

$$[0.25_{Mickey}, 0.125_{MP3}$$
$$0.125_{Fourth\ Generation}, 0.125_{Blinking}$$
$$0.125_{2G}, 0.125_{multiple\ colors}, 0.125_{choice}]$$

$0.25_{Mickey}$ represents the probability of appearance of "Mickey" in the product title. In other word, it appears twice in the product title composed of eight words. The same or similar definition applies to the other elements in the product title vector.

In addition, each word in the category may have different word frequency. Thus each category may be represented as the category vector. The category vector for category C of the above product title may be represented as:

$$[TF_{Mickey,C}, TF_{MP3,C}, TF_{Fourth\ Generation,C}, TF_{Blinking,C},$$
$$TF_{2G,C}, TF_{multiple\ colors,C}, TF_{choice,C}]$$

$TF_{Mickey,C}$ represent the word frequency of "Mickey" in category C. The same or similar definition applies to the other elements of the category vector.

With regard to category C, the product of the product title vector and the category vector is:

$$[0.25_{Mickey}, 0.125_{MP3}, 0.125_{Fourth\ Generation}$$
$$0.125_{2G}, 0.125_{multiple\ colors}, 0.125_{choice}] \times$$
$$[TF_{Mickey,C}, TF_{MP3,C}, TF_{Fourth\ Generation,C}$$
$$TF_{Blinking,C}, TF_{2G,C}, TF_{multiple\ colors,C}$$
$$TF_{choice,C}] = 0.25_{Mickey} \times TF_{Mickey,C} + 0.125_{MP3} \times$$
$$TF_{MP3,C} + 0.125_{Fourth\ Generation} \times TF_{Fourth\ Generation,C} +$$
$$0.125_{Blinking} \times TF_{Blinking,C} + 0.125_{2G} \times TF_{2G,C} +$$
$$0.125_{many\ colors} \times TF_{many\ colors,C} + 0.125_{choice} \times$$
$$TF_{choice,C}$$

Based on the above method, the product of the product title vector and the category vector for each of the predicted category may be calculated. The predicted category with the highest product value may be selected as the target category.

In this example, it is assumed that any word under any category has a word frequency greater than 0. But in reality, that might not be the case. If a word t has not appeared in category C, then the probability PNC) of the word t in the category C is 0. The posterior probability P(t|C) for the product title T containing the word t for category C is also 0. In order to smoothly process this kind of scenario, based on an example embodiment of the present disclosure, if PNC) needs calculation and word t has not appeared in category C, then it is deemed that the word t appears once in category C. For this scenario, the word frequency of $t_i$ in category C may be represented by using the formula below:

$$P(t_i \mid C) = \frac{1}{\sum_{i=1,2,\ldots,n} \#t_i} \quad (4)$$

In the above formula (4), $t_i$ represents any word that appears in category C, $\#t_i$ represents the number of times that $t_i$ appear in category C, and n represents any integer.

Since the number of words under a category is very large, counting one for a word that has not appeared will not affect the degree of accuracy of the results.

In the method of the example embodiment, in calculation of a word frequency of a word under a category, when the word has not appeared in the category, it may be deemed that the word appears once in the category to increase the comprehensiveness of identifying the category misplacement.

At 306, the posterior probability of the product title in the category may be represented by using the Bayesian formula as shown below:

$$P(C \mid T) = \quad (5)$$
$$\frac{P(C, T)}{P(T)} = \frac{P(C, T)}{P(C)} \cdot \frac{P(C)}{P(T)} = P(T \mid C) \cdot \frac{P(C)}{P(T)} = P(t_1 t_2 \ldots t_n \mid C) \cdot \frac{P(C)}{P(T)}$$

In the above formula, P(C|T) represents the posterior probability of product title T in category C, P(C) represents the number of all products under category C, and P(T) represents a constant which is the same for any category C.

If it is assumed that each word in the product title follow an independent distribution, then formula (5) may be simplified as:

$$P(C \mid T) = \left( \sum_{i=1,2,\ldots n} P(t_i \mid C) \right) \cdot \frac{P(C)}{P(T)} \quad (6)$$

In formula (6), $P(t_i|C)$ represents the posterior probability of the word $t_i$ in category C.

Based on formula (6), if the word frequency of a word under a category and the number of products in the category are known, then the posterior probability of the product title in the category can be calculated.

At 312, based on formula (6), the posterior probability of the product title under the current category and the posterior probability of the product title under the target category can be calculated. For example, $P(C_{old}|T)$ represents the calculation for the posterior probability of the product title under the current category, and $P(C_{new}|T)$ represents the calculation for the posterior probability of the product title under the target category. If the difference or ratio between $P(C_{old}|T)$ and $P(C_{new}|T)$ is greater than a third threshold, it means that the target category is a better match for the product title than the current category, and the category misplacement exists. If the difference or ratio between $P(C_{old}|T)$ and $P(C_{new}|T)$ is less than or equal to the third threshold, it means that the target category is not a better match for the product title than the current category, and the category misplacement may not exist.

The value of the third threshold may be determined based on the actual requirements of data processing. The database for the third threshold may be stored in the corresponding storage device. In one example, the value of the third threshold may be big enough that $P(C_{new}|T)$ is much bigger than $P(C_{old}|T)$. Thus it may more accurately guarantee that the target category matches the product title, and increase the degree of accuracy in identifying category misplacement.

Operations at 302 and 304 in the third example embodiment are similar to those at 202 and 204 respectively in the second example embodiment, and are not detailed herein.

For the techniques in the third example embodiment of the present disclosure, if the overall relevancy degree value between the product title and the current category is less than the second threshold, then it may be determined that there is abnormality in category placement. After the target category is obtained, the posterior probability of the product title under the current category is compared with the posterior probability of the product title under the target category to further determine whether there is a category more appropriate than the current category. The techniques not only more accurately identify existence of category misplacement exists, but also provide a more appropriate target category for the product with misplaced product title.

Figure 4:
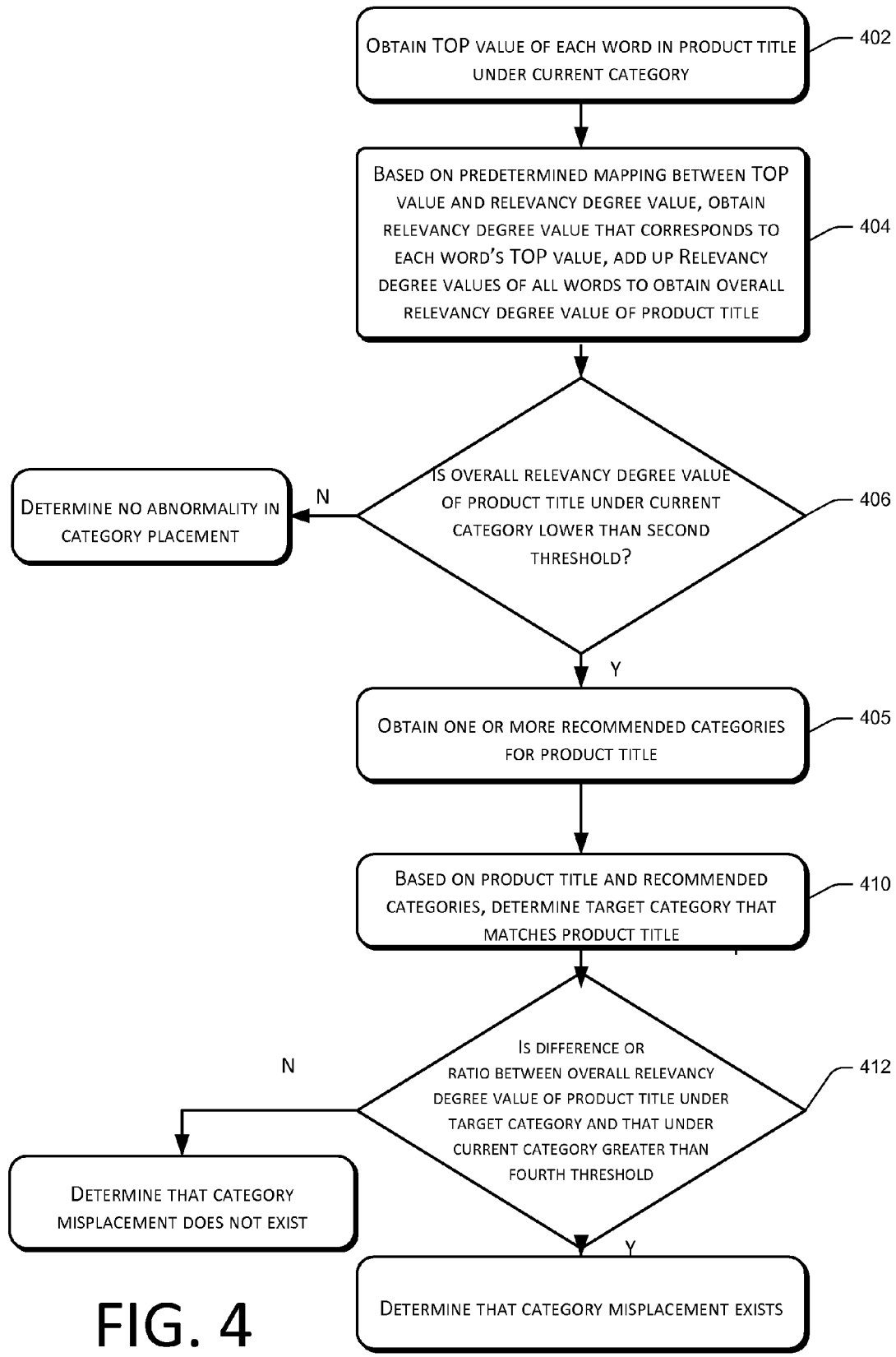
FIG. 4 illustrates a flowchart of an example method for identifying category misplacement in accordance with a fourth example embodiment of the present disclosure.

In the third example embodiment, the posterior probability of the product title under the current category is compared with the posterior probability of the product title under the target category to determine if category misplacement exists or not. Alternatively, the overall relevancy degree of the product title under the current category is compared with the overall relevancy degree of the product title under the target category to determine if category misplacement exists or not. FIG. 4 illustrates a flowchart of an example method for identifying category misplacement in the fourth example embodiment of the present disclosure.

At 402, for each word in the product title, its respective TOP value under the current category is obtained.

At 404, based on a predetermined mapping between the TOP value and the relevancy degree value, the relevancy degree value that corresponds to each word's TOP value is obtained. The relevancy degree values corresponding to the TOP values of all words in the product title are added up to obtain an overall relevancy degree value of the product title.

At 406, the product title's overall relevancy degree value under the current category is compared with a second threshold. If the product title's overall relevancy degree value under the current category is less than the second threshold, it is determined that there is abnormal category misplacement and operations at 404 are performed. If the product title's overall relevancy degree value under the current category is less than the second threshold, it is determined that there is no abnormal category misplacement.

At 408, a recommended category for the product title is obtained.

At 410, based on the product title and the product title's recommended category, a target category that matches the said product title is obtained.

Operations from 402 to 410 are similar to those from 302 to 310 in the third example embodiment are not detailed herein. The discussion below describes the differences between the fourth example embodiment and the third example embodiment.

At 412, the overall relevancy degree value of the product title under the target category is obtained. The overall relevancy degree value of the product title under the target category is compared with the overall relevancy degree value of the product title under the current category. If the difference or ratio between the overall relevancy degree value of the product title under the target category and the overall relevancy degree value of the product title under the current category is greater than the fourth threshold, then it is determined that category misplacement exists. Otherwise, it is determined that no category misplacement exists. The operations also end here.

At 412, through comparison of the overall relevancy degree value of the product title under the target category and the overall relevancy degree value of the product title under the current category, it may determine whether the target category is a better match for the product title. The fourth threshold may be defined based on the actual requirements of data processing, and the database for the fourth threshold may be stored in the corresponding storage device. In one example, the value of the fourth threshold is big enough that the overall relevancy degree value of the product title under the target category is much bigger than the overall relevancy degree value of the product title under the current category. Thus it may more accurately guarantee that the target category matches the product title, and increase the degree of accuracy in identifying category misplacement.

The overall relevancy degree value of the product title under the target category and the overall relevancy degree value of the product title under the current category may be obtained and calculated based on the method for obtaining the overall relevancy degree value of the product title under a category as described in the second example embodiment, and are not detailed herein.

In the techniques discussed in the fourth example embodiment of the present disclosure, if the relevancy degree value of the product title under the current category is less than the second threshold, then it is determined that there is abnormality in product placement. After the target category is obtained, the overall relevancy degree value of the product title under the target category is compared with the overall relevancy degree value of the product title under the current category to determine whether there is a category more appropriate than the current category, and eventually determine if there is category misplacement. Through these two determinations, it would more accurately determine if category misplacement exists or not, and would reduce the probability of missing the category misplacements. The techniques of the fourth example embodiment mainly involves obtaining the TOP value and the overall relevancy degree value, and comparing the overall relevancy degree value of the product title under the target category with the overall relevancy degree value of the product title under the current category. Compared with the present technology, these techniques required less system resources are low, thereby conserving system resources and increasing operational efficiency.

The methods for identifying category misplacement in the present disclosure may be implemented by using computer-readable instructions executed by one or more processors in computers and other hardware.

Based on an example embodiment of the present disclosure, the C++ programming language may be used for implementing the category misplacement identification methods in a distributed cluster environment. The distributed cluster environment, in terms of hardware architecture, may include, for example, cluster of workstation (COW), massively parallel processor (MPP), symmetric multi-processor (SMP), distributed heterogeneous computing cluster (such as GRID), which are not described herein.

The following describes several devices for identifying category misplacements to implement the above described methods.

Figure 5:
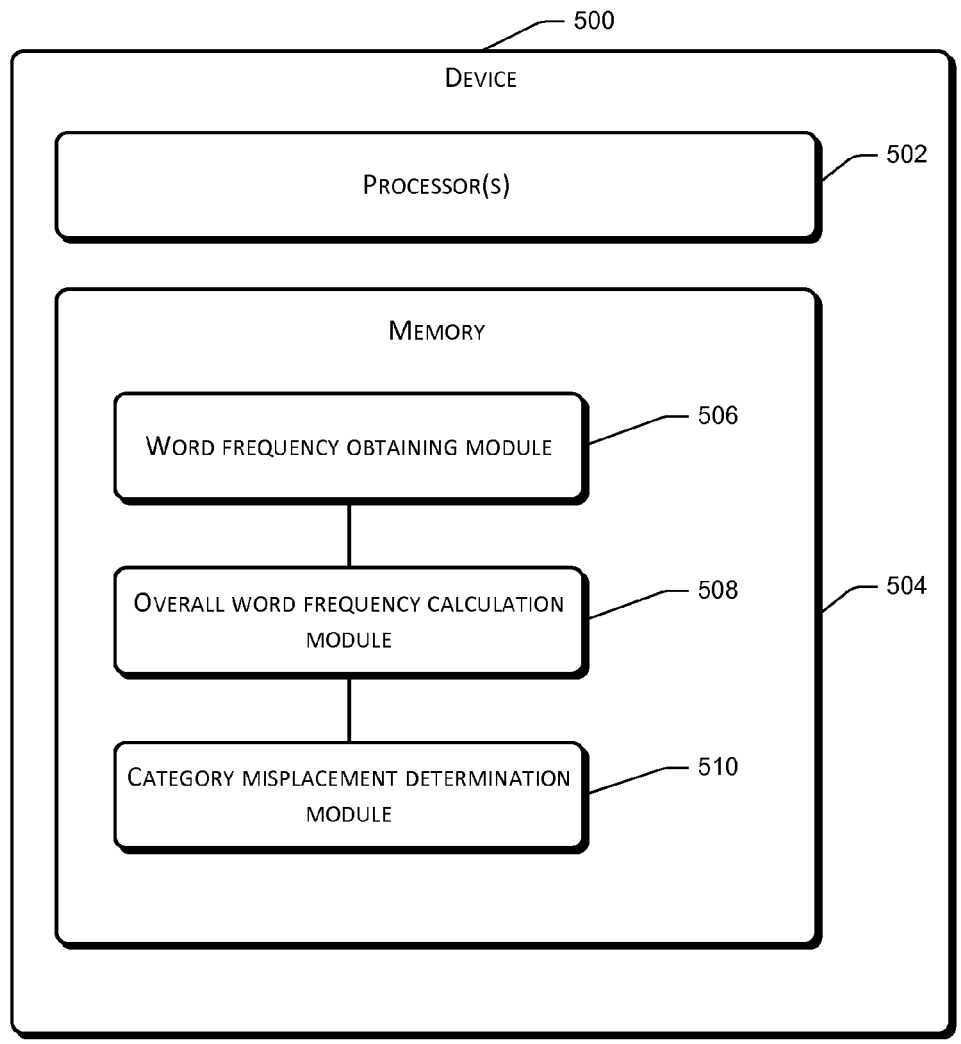
FIG. 5 illustrates a diagram of an example device for identifying category misplacement in accordance with a fifth example embodiment of the present disclosure.

FIG. 5 illustrates a diagram of an example device 500 for identifying category misplacement in accordance with a fifth example embodiment of the present disclosure.

In one example, the device 500 can include, but is not limited to, one or more processors 502 and memory 504. The memory 504 may include computer-readable media in the form of volatile memory, such as random-access memory (RAM) and/or non-volatile memory, such as read only memory (ROM) or flash RAM. The memory 604 is an example of computer-readable media.

Computer-readable media includes volatile and non-volatile, removable and non-removable media implemented in any method or technology for storage of information such as computer-executable instructions, data structures, program modules, or other data. Examples of computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include transitory media such as modulated data signals and carrier waves.

The memory 504 may store therein program units or modules and program data. In one embodiment, the modules may include a word frequency obtaining module 506, an overall word frequency calculation module 508, and a category misplacement determination module 510. These modules may therefore be implemented in computer-readable instructions that can be executed by the one or more processors 502. In other implementations, the modules may be implemented in firmware, hardware, software, or a combination thereof.

In one example, the overall word frequency calculation module 508 and the word frequency obtaining module 506 are associated, and the category misplacement determination module 510 and the overall word frequency calculation module 508 are associated. The device 500 for identifying category misplacement may use the method as described in the first example embodiment.

The word frequency obtaining module 506 obtains a word frequency of each word in a product title under a current category.

The overall word frequency calculation module 508, based on the word frequency of each word under the current category, calculates the overall word frequency of the product title.

The category misplacement determination module 510 compares the overall word frequency of the product title calculated by the overall word frequency calculation module 508 with a first threshold of the current category and, based on a result of the comparison, determines whether there is category misplacement.

Figure 6:
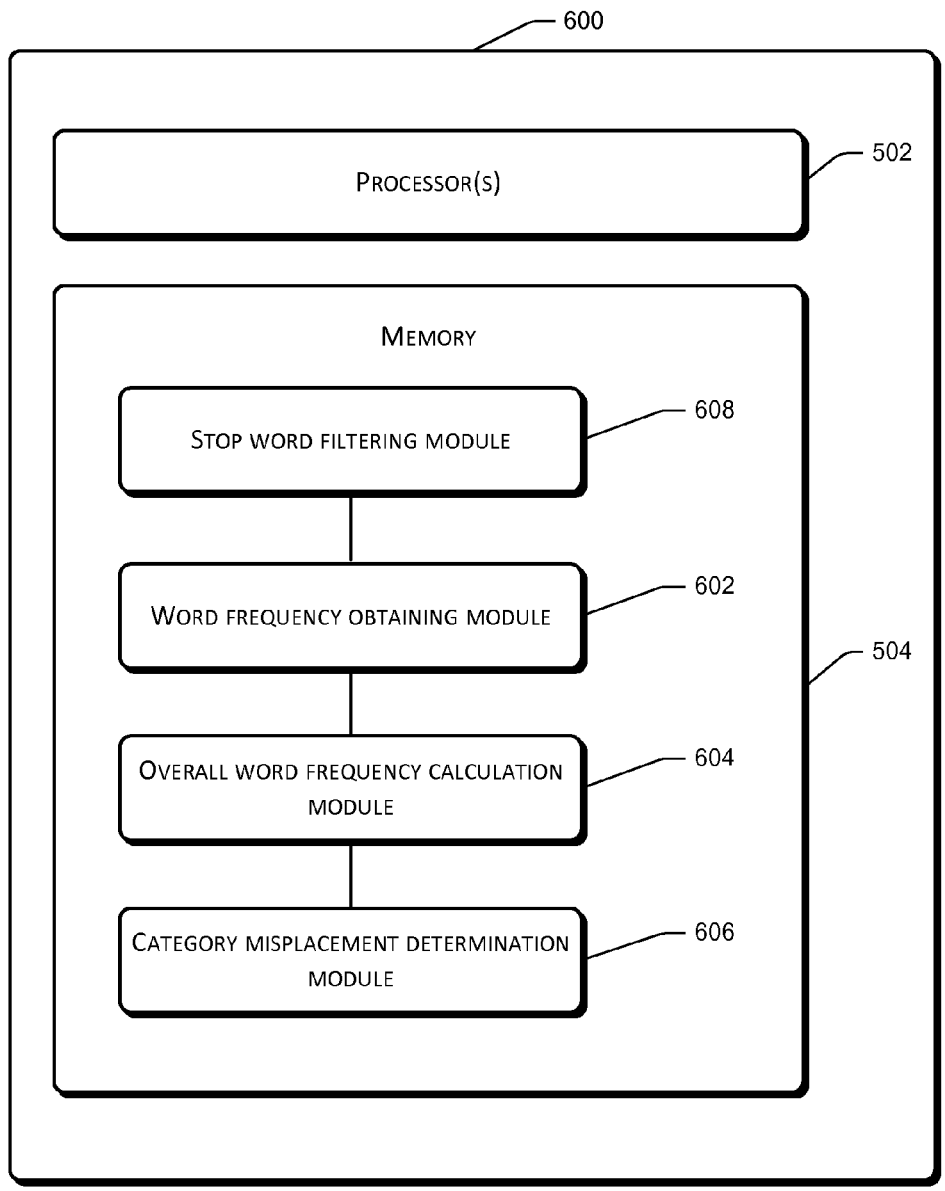
FIG. 6 illustrates a diagram of an example device for identifying category misplacement in accordance with a sixth example embodiment of the present disclosure.

FIG. 6 illustrates a diagram of an example device 600 for identifying category misplacement in accordance with a sixth example embodiment of the present disclosure. For example, the device 600 for identifying category misplacement may also implement the method as described in the first example embodiment.

In one embodiment, the device 500 can include, but is not limited to, one or more processors 502 and memory 504. The memory 504 may store therein program units or modules and program data. The modules may therefore be implemented in computer-readable instructions that can be executed by the one or more processors 502. In other implementations, the modules may be implemented in firmware, hardware, software, or a combination thereof.

In one embodiment, the modules may include a word frequency obtaining module 602, an overall word frequency calculation module 604, and a category misplacement determination module 606. These modules may be the same as or similar to those modules with same names described in FIG. 5 respectively and are not detailed herein.

The modules in the device 600 may further include a stop words filtering module 608 that is associated with the word frequency obtaining module 602. The stop words filtering module 608 filters the stop words among the words in the product title before the word frequency obtaining module 602 obtains a word frequency of each word in the product title under a current category.

Figure 7:
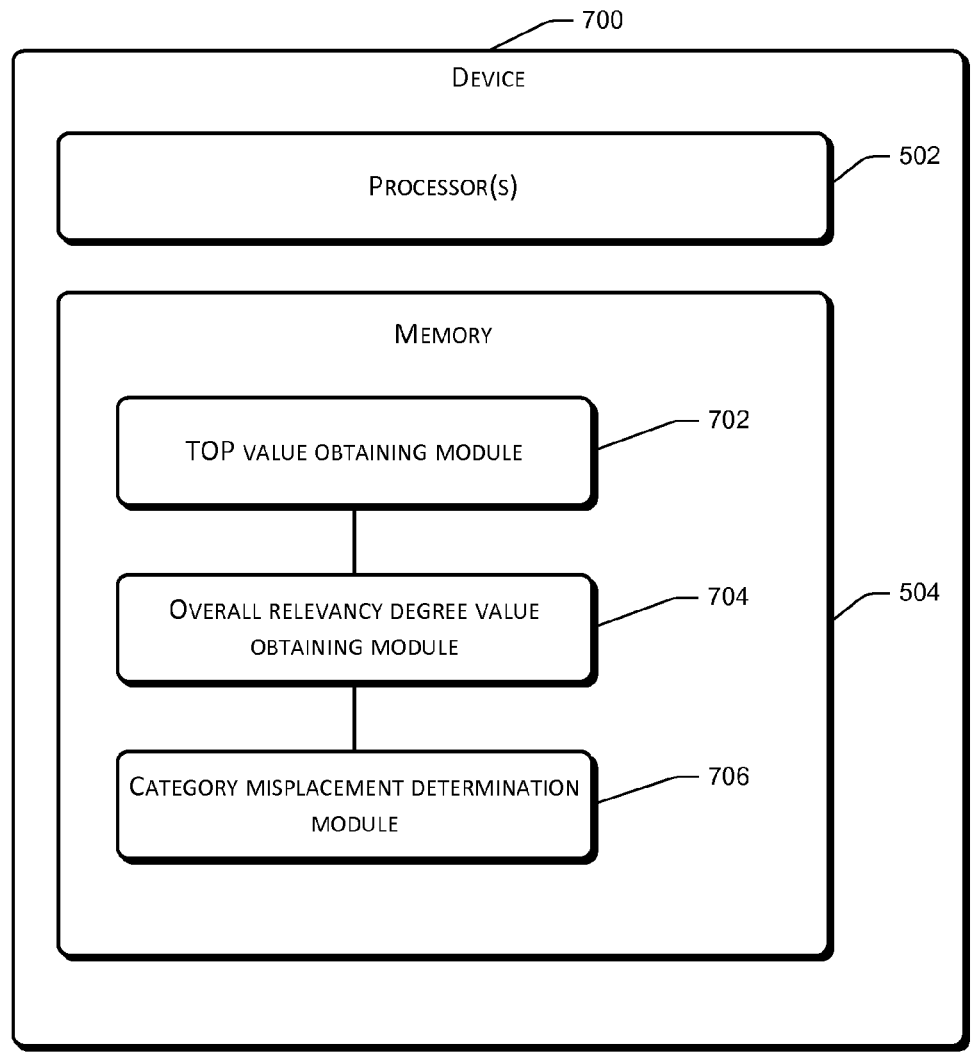
FIG. 7 illustrates a diagram of an example device for identifying category misplacement in accordance with a seventh example embodiment of the present disclosure.

FIG. 7 illustrates a diagram of an example device 700 for identifying category misplacement in accordance with a seventh example embodiment of the present disclosure. For example, the device 700 for identifying category misplacement may implement the method as described in the second example embodiment.

In one embodiment, the device 700 can include, but is not limited to, one or more processors 502 and memory 504. The memory 504 may store therein program units or modules and program data. The modules may therefore be implemented in computer-readable instructions that can be executed by the one or more processors 502. In other implementations, the modules may be implemented in firmware, hardware, software, or a combination thereof.

In one embodiment, the modules may include a TOP value obtaining module 702, an overall relevancy degree value obtaining module 704, and a category misplacement determination module 706. The overall relevancy degree value obtaining module 704 is associated with the TOP value obtaining module 702 and the category misplacement determination module 706 is associated with the overall relevancy degree value obtaining module 704.

The TOP value obtaining module 702 obtains a respective TOP value for each word of the product title under the current category. The TOP value of the word under the current category is the sum of word frequencies of all words whose word frequencies are higher than the word frequency of the word.

The overall relevancy degree value obtaining module 704, based on a predetermined mapping between the TOP value and the relevancy degree value, obtains the relevancy degree value that corresponds to each word's TOP value, adds up the relevancy degree values corresponding to the TOP values of all words in the product title, and obtains an overall relevancy degree value of the product title.

The category misplacement determination module 706 compares the product title's overall relevancy degree value under the current category with a second threshold, and based on the results of the comparison, determines whether the product title has been placed in the wrong category or not. If the product title's overall relevancy degree value under the current category is less than the second threshold, the category misplacement determination module 706 determines that there is category misplacement. If the product title's overall relevancy degree value under the current category is equal to or larger than the second threshold, the category misplacement determination module 706 determines that there is no category misplacement.

Figure 8:
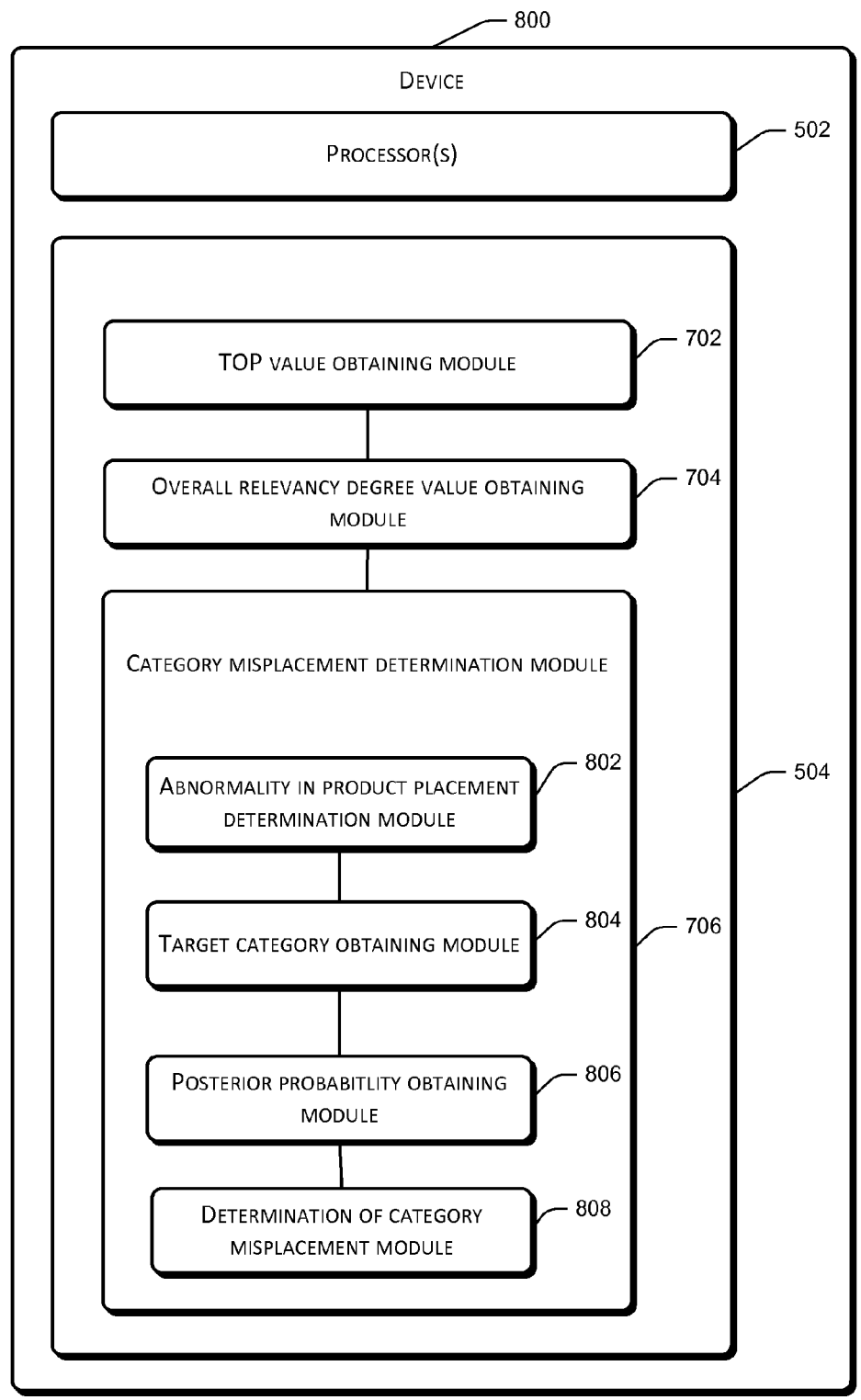
FIG. 8 illustrates a diagram of an example device for identifying category misplacement in accordance with an eighth example embodiment of the present disclosure.

FIG. 8 illustrates a diagram of an example device 800 for identifying category misplacement in accordance with an eighth example embodiment of the present disclosure. For example, the device 800 for identifying category misplacement may implement the method as described in the third example embodiment.

In one embodiment, the device 800 can include, but is not limited to, one or more processors 502 and memory 504. The memory 504 may store therein program units or modules and program data. The modules may therefore be implemented in computer-readable instructions that can be executed by the one or more processors 502. In other implementations, the modules may be implemented in firmware, hardware, software, or a combination thereof.

In one embodiment, the modules may include the TOP value obtaining module 702 and an overall relevancy degree value obtaining module 704, which are same as or similar to those described in the seventh embodiments and are not detailed herein. Unlike the seventh example embodiment, the modules may further include the category misplacement determination module 706 that includes an abnormality in product placement determination module 802, a target category obtaining module 804, a posterior probability obtaining module 806, and a determination of category misplacement module 808. In one embodiment, the target category obtaining module 804 may be associated with the abnormality in product placement module 802, the posterior probability obtaining module 806 may be associated with the target category obtaining module 804, and the determination of category misplacement module 808 may be associated with the posterior probability obtaining module 806.

The abnormality in product placement determination module 802 compares an overall relevancy degree value of a product title under a current category with a second threshold. If the overall relevancy degree value of the product title under the current category is less than the second threshold, then the abnormality in product placement module 802 determines that there is abnormality in product placement.

The target category obtaining module 804 obtains one or more recommended categories for the product title after the abnormality in product placement module 802 determines that there is abnormality in product placement. Based on the product title and the one or more recommended categories for the product title, the target category obtaining module 804 obtains a target category that matches the product title.

The posterior probability obtaining module 806 obtains a posterior probability of the product title under the target category and a posterior probability of the product title under the current category.

The determination of category misplacement module 808 compares the posterior probability of the product title under the target category and the posterior probability of the product title under the current category. If the difference or ratio between the posterior probability of the product title under the target category and the posterior probability of the product title under the current category is greater than a third threshold, then the determination of category misplacement module 808 determines that category misplacement exists.

Figure 9:
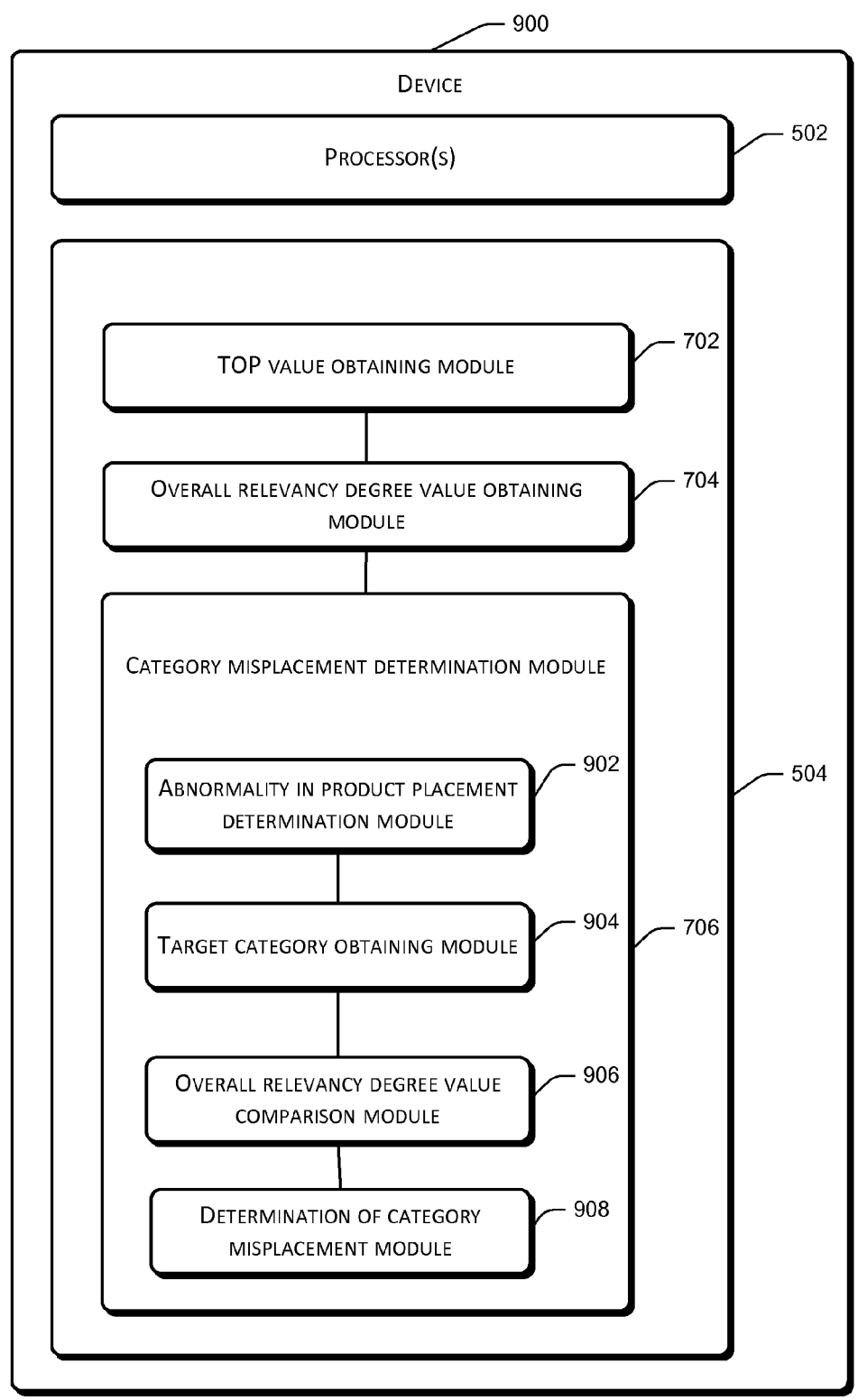
FIG. 9 illustrates a diagram of an example device for identifying category misplacement in accordance with a ninth example embodiment of the present disclosure.

FIG. 9 illustrates a diagram of an example device 900 for identifying category misplacement in accordance with a ninth example embodiment of the present disclosure. For example, the device 900 for identifying category misplacement may implement the method as described in the fourth example embodiment.

In one embodiment, the device 900 can include, but is not limited to, one or more processors 502 and memory 504. The memory 504 may store therein program units or modules and program data. The modules may therefore be implemented in computer-readable instructions that can be executed by the one or more processors 502. In other implementations, the modules may be implemented in firmware, hardware, software, or a combination thereof.

In one embodiment, the modules may include the TOP value obtaining module 702 and an overall relevancy degree value obtaining module 704, which are same as or similar to those described in the seventh embodiments and are not detailed herein. Unlike the seventh example embodiment, the modules may further include a category misplacement determination module 706 that includes an abnormality in product placement determination module 902, a target category obtaining module 904, an overall relevancy degree value comparison module 906, and a determination of category misplacement module 908.

In one embodiment, the target category obtaining module 904 may be associated with the abnormality in product placement module 902, the overall relevancy degree value comparison module 906 may be associated with the target category obtaining module 904, and the determination of category misplacement module 908 may be associated with the overall relevancy degree value comparison module 906.

The abnormality in product placement module 902 compares an overall relevancy degree value of a product title under a current category with a second threshold. If the overall relevancy degree value of the product title under the current category is less than the second threshold, then the abnormality in product placement module 902 determines that there is abnormality in product placement.

The target category obtaining module 904 obtains one or more recommended categories for the product title after the abnormality in product placement module 902 determines that there is abnormality in product placement. Based on the product title and the one or more recommended categories for the product title, the target category obtaining module 804 obtains a target category that matches the product title.

The overall relevancy degree value comparison module 906 compares the overall relevancy degree value of the product title under the target category obtained by the target category obtaining module 904 with the overall relevancy degree value of the product title under the current category.

The determination of category misplacement module 908 determines that category misplacement exists if the difference or ratio between the overall relevancy degree value of the product title under the target category and the overall relevancy degree value of the product title under the current category is greater than a fourth threshold.

Figure 10:
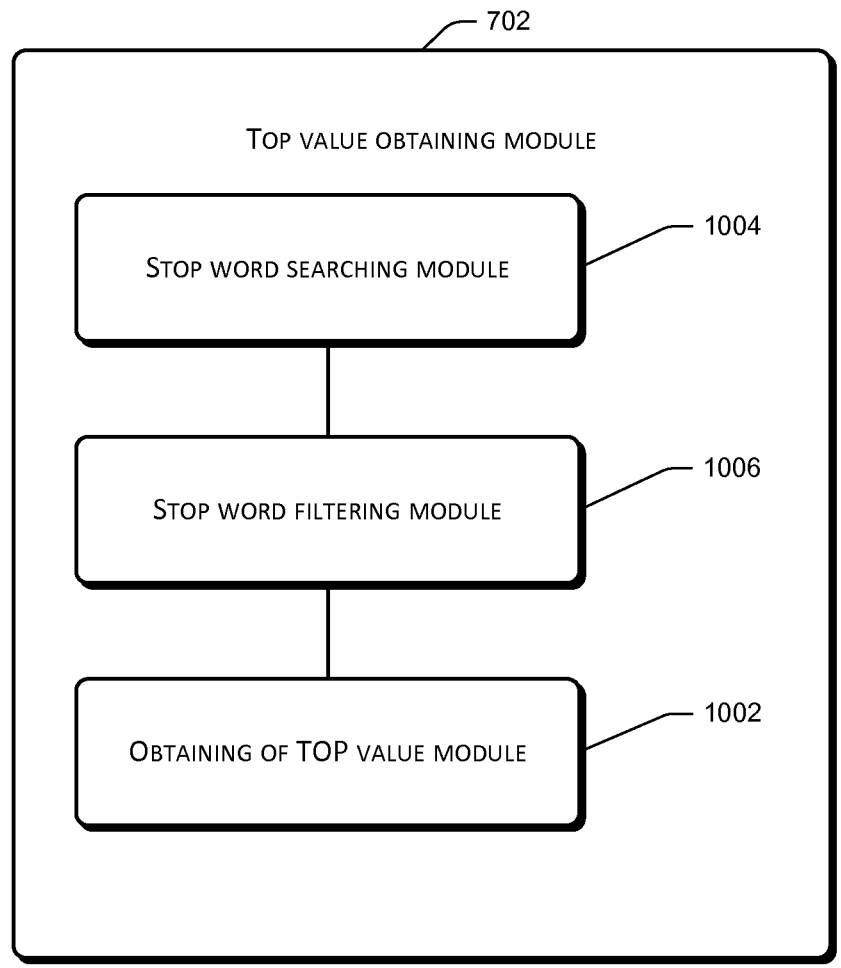
FIG. 10 illustrates a diagram of an example TOP value obtaining module.

From the seventh example embodiment to the ninth example embodiment, as shown in FIG. 10, the TOP value obtaining module 702 may include an obtaining of TOP value module 1002, a stop word searching module 1004, and a stop word filtering module 1006. In one embodiment, the stop word filtering module 1006 is associated with the obtaining of TOP value module 1002 and the stop word searching module 1004.

The stop word searching module 1004 determines if a product title contains one or more stop words based on distribution entropy of words in the category. The stop word filtering module 1006 filters the one or more stop words after the stop word searching module 1004 determines that the one or more stop words exist. After the stop words have been filtered out, the obtaining of TOP value module 1002 obtains the TOP value of each word under the current category.

The devices in the present disclosure are capable to determine whether there is category misplacement based on the result of the comparison between the overall word frequency of the product title and the first threshold. In addition, the TOP value can reflect a degree of matching between the product title and the category. Thus the overall relevancy degree value between the product title and the category determined by the TOP value can also reflect a matching degree between the product tile and the category. The result of comparison between the overall relevancy degree value of the product title under the category and the second threshold can also be used to determine whether there exists category misplacement. The setting of the second threshold can reduce the probability of missing category misplacements. For example, if the second threshold is set at a lower value, a majority of category misplacements may be identified. In addition, the techniques disclosed in the present disclosure relate to obtaining the TOP value and the overall relevancy degree value. Compared with the current techniques, the devices disclosed in the present disclosure to obtain such values require less system resources and improve calculation efficiency.

It is appreciated that the first threshold may be the same or different in different example embodiment and the first threshold may be same or different under different categories. Such principles also apply to the second threshold, the third threshold, and the fourth threshold.

From the example embodiments described above, one of ordinary skill in the art can clearly understand that the disclosed method and system may be implemented using software and universal hardware platform. Based on this understanding, the technical scheme of the present disclosure, or portions contributing to existing technologies, may be implemented in the form of software products which are stored in a storage media such as ROM/RAM, hard drive and optical disk. The software includes computer-executable instructions for a computing device (e.g., personal computer, server or networked device) to execute the method described in the example embodiments of the present disclosure.

The various example embodiments are progressively described in the present disclosure. Same or similar portions of the example embodiments can be mutually referenced. Each example embodiment has a different focus than other example embodiments. In particular, the example device embodiment has been described in a relatively simple manner because of its fundamental correspondence with the example method. Details thereof can be found with reference to related portions of the example method. Descriptions of the above example device are meant for illustrative purpose only. Units or modules described as separate components therein may or may not be physically separated. The modules described in the embodiments may be merged into one module or be further divided into multiple sub-modules. Components illustrated in terms of units or modules may or may not be physical units, e.g., may be located in one place or may be distributed among multiple network units. Depending on the actual needs, the goal of the example embodiments may be achieved by selecting parts or all of the modules. One of ordinary skill in the art can understand and implement the disclosed system without any innovative effect.

The disclosed method and system may be used in an environment or in a configuration of universal computer systems with software or specialized computer systems. Examples include a personal computer, a server computer, a handheld device or a portable device, a tablet device, a multi-processor system, a microprocessor-based system, a set-up box, a programmable customer electronic device, a network PC, a small-scale computer, a large-scale computer, and a distributed computing environment including any system or device above.

The present disclosure may be described within a general context of computer-executable instructions executed by a computer, such as a program module. Generally, a program module includes routines, programs, objects, modules, data structure, computer-executable instructions and etc., for executing specific tasks or implementing specific abstract data types. The disclosed method and device may also be implemented in a distributed computing environment. In the distributed computing environment, a task is executed by remote processing devices which are connected through a communication network. In distributed computing environment, the program modules may be located in storage media (which include storage devices) of local and/or remote computers.

Above are example embodiments of the present disclosure. However, the present disclosure is not limited hereto. The terminologies used herein are for illustration purposes, and not for limiting the present disclosure. Since the present disclosure can be specifically implemented using many forms without deviating from the spirit or essence of the invention, the above example embodiments are not limited to the details discussed above, and should be broadly interpreted under the essence and scope defined in the claims. It is to be appreciated that one of ordinary skill in the art can alter or modify the present disclosure in many different ways without departing from the spirit and the scope of this disclosure. These modifications and variations should therefore be considered to fall within the scope of the claims of the present disclosure and their equivalents.

What is claimed is:

1. A method comprising:
    obtaining a word frequency of one or more words in a product title under a first category and another word frequency of the one or more words in the product title under a second category;
    calculating a first overall word frequency of the product title under the first category based on the word frequency of the one or more words in the product title under the first category and a second overall word frequency of the product title under the second category based on the word frequency of the one or more words in the product title under the second category;
    setting a first threshold for the first category and a second threshold for the second category;
    storing the first threshold and the second threshold in a storage device; and
    comparing the first overall word frequency of the product title with the first threshold and the second overall word frequency of the product title with the second threshold to determine a category of the product title.

2. The method as recited in claim 1, further comprising in an event that the first overall word frequency of the product title is higher than the first threshold, determining that the category of the product title is the first category.

3. The method as recited in claim 1, further comprising:
    determining one or more stop words from the product title; and
    filtering the one or more stop words from the product title prior to obtaining the word frequency of the one or more words in the product title under the first category and another word frequency of the one or more words in the product title under the second category, the one or more words in the product title including none of the one or more stop words.

4. The method as recited in claim 3, wherein the determining the one or more stop words from the product title comprises presetting a table of stop words.

5. The method as recited in claim 4, further comprising:
    determining a distribution entropy of a word under multiple categories;
    determining that the word is a stop word when the distribution of the word is higher than a threshold for stop word; and
    adding the word into the table of stop words.

6. The method as recited in claim 5, further comprising:
    ranking multiple words based on their respective distribution entropy under the multiple categories; and
    determining the threshold for stop word based on an order of the ranking.

7. The method as recited in claim 1, wherein the first threshold is different from the second threshold.

8. The method as recited in claim 1, wherein the obtaining the word frequency of the one or more words in the product title under the first category and another word frequency of the one or more words in the product title under the second category comprises:

in an event that a respective word does not appear in the first category, counting that the respective word appears once in the first category.

9. A method comprising:
obtaining one or more recommended categories for each of multiple words in a product title;
combining the one or more recommended categories for each of the multiple words to obtain a plurality of recommended categories for the product title;
using a word frequency of a respective word in the multiple words under each of the plurality of recommended categories for the product title as a weight of the respective word under a respective recommended category for the product title;
calculating a sum of weights of the multiple words for each of the plurality of recommended categories for the product title; and
choosing one or more recommended categories for the product title based on a result of calculating the sum of weights of the multiple words for each of the plurality of recommended categories.

10. The method of claim 9, wherein the obtaining the one or more recommended categories for each of the multiple words in the product title comprises:
selecting one or more recommended categories for the respective word in the multiple words based on the word frequency of the respective word under different categories.

11. The method of claim 9, wherein the choosing one or more recommended categories for the product title based on the result of calculating the sum of weights of the multiple words for each of the plurality of recommended categories comprises:
choosing a recommended category with a highest sum of weights of the multiple words as a target category.

12. The method of claim 9, wherein the choosing one or more recommended categories for the product title based on the result of calculating the sum of weights of the multiple words for each of the plurality of recommended categories comprises:
ranking the plurality of recommended categories according to respective sum of weights of the multiple words for each of the plurality of recommend categories; and
choosing the one or more recommended categories with top rankings as candidates of a target category.

13. The method as recited in claim 9, further comprising:
determining one or more stop words from the product title; and
filtering the one or more stop words from the product title prior to selecting the one or more recommended categories for each of the multiple words in a product title, the multiple words in the product title including none of the one or more stop words.

14. The method as recited in claim 13, wherein the determining the one or more stop words from the product title comprises presetting a table of stop words.

15. The method as recited in claim 14, further comprising:
determining a distribution entropy of a word under multiple categories;
determining that the word is a stop word when the distribution of the word is higher than a threshold for stop word; and
adding the word into the table of stop words.

16. The method as recited in claim 15, further comprising:
ranking multiple words based on their respective distribution entropy under the multiple categories; and
determining the threshold for stop word based on an order of the ranking.

17. A method comprising:
obtaining one or more recommended categories for a product title;
obtaining a product title vector and a respective category vector for a respective recommended category, one or more elements of the product title vector including a probability of appearance of one or more words in the product title, and one or more elements of the respective category vector including a word frequency of the one or more words under the respective recommended category;
obtaining a respective product of the product title vector and the category vector for the respective recommended category; and
choosing a target category from the one or more recommended categories based on a result of the respective product for the respective recommended category.

18. The method as recited in claim 17, wherein the choosing the target category from the one or more recommended categories based on the result of the respective product for the respective recommended category comprises choosing a recommended category with a highest product as the target category.

19. The method as recited in claim 17, further comprising
determining one or more stop words from the product title; and
filtering the one or more stop words from the product title, the one or more words in the product title including none of the one or more stop words.

20. The method as recited in claim 19, wherein the determining one or more stop words from the product title comprises:
determining a distribution entropy of a word under multiple categories;
determining that the word is a stop word when the distribution of the word is higher than a threshold for stop word; and
adding the word into a table of stop words.

* * * * *